Patented Oct. 26, 1926.

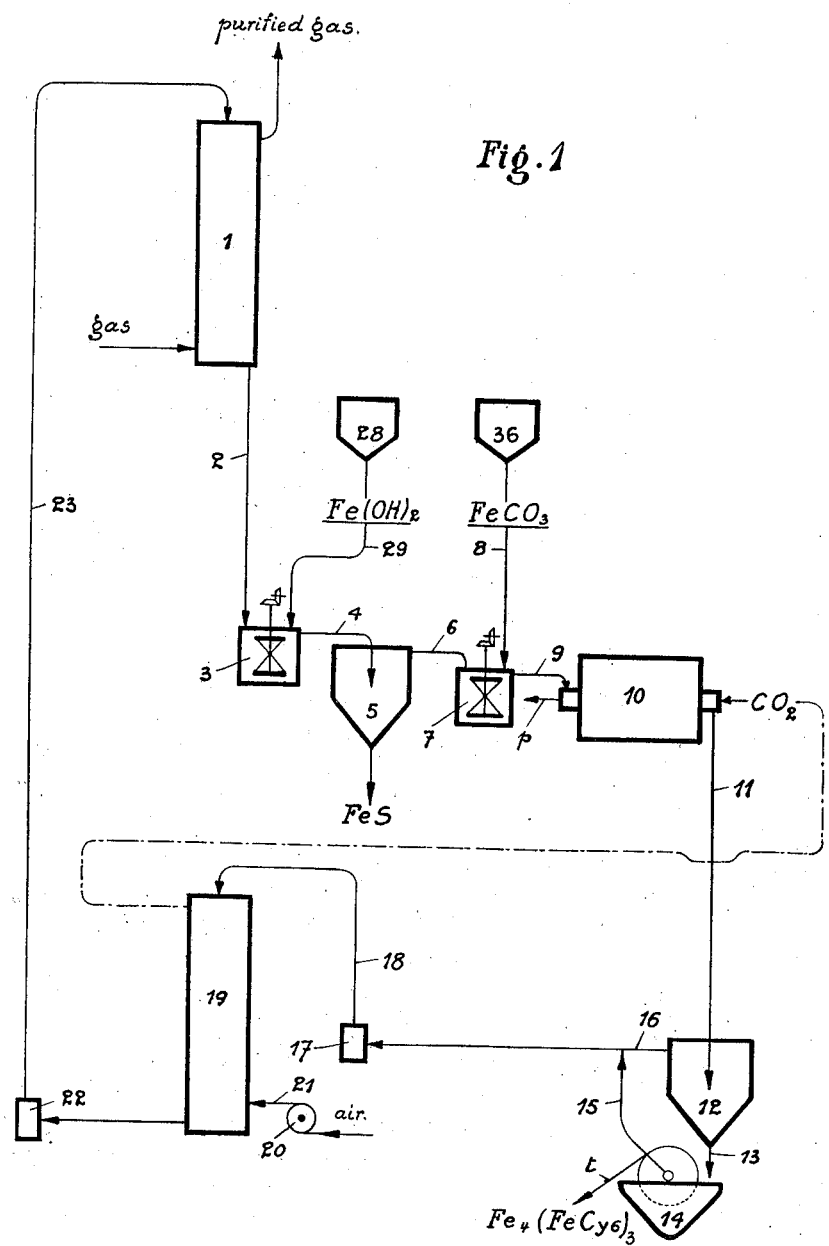

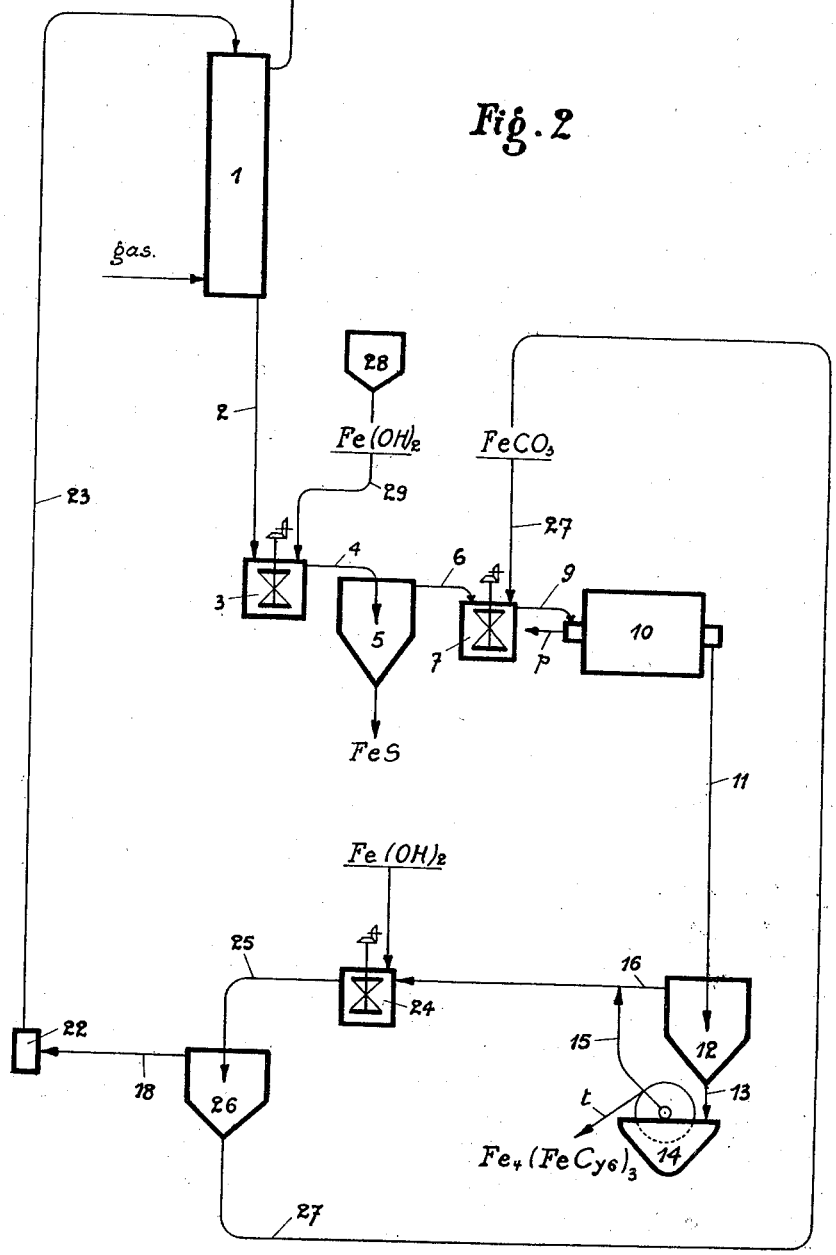

1,604,565

UNITED STATES PATENT OFFICE.

SYLVAIN COULIER, OF BRUSSELS, BELGIUM.

PURIFICATION OF GASES.

Application filed October 16, 1925, Serial No. 62,874, and in Belgium October 18, 1924.

This invention relates to a process for the purification of gases with a view to removing from them sulphuretted and cyanide compounds such as sulphuretted hydrogen and hydrocyanic acid or other objectionable constituents of the same type, in which these are absorbed by an alkaline solution which may be regenerated and used again in the purifying process.

It is known to make use, for this purpose, of alkalis and their carbonates or mixtures of these and to bring the polluted purifying solution, in the presence of a compound of iron which is capable of fixing the absorbed sulphur, into the state of iron sulphide which is separated out, or else to utilize, as purifying agent, an alkaline solution containing in suspension the compounds of iron; the sulphide of iron formed being separated from the alkaline solution before the regeneration of the latter, which is effected, for example, by means of a current of air.

In these known processes, the cyanogen which remains in solution, either in the state of alkaline cyanide or in the state of alkali metal ferrocyanide, was not recuperated and could only be partly driven out of the purifying solution when regeneration by air took place.

The object of the invention is to obtain a process for the purification of gases in which not only the sulphur, but also the cyanogen is directly recuperated in the form of a product of value, for instance in the form of Prussian blue or ferric ferrocyanide having a very high degree of purity.

The process according to the invention may be employed with any alkaline solution, whether it contains a compound of iron in suspension or whether this compound is made to act after the absorption of the sulphuretted and cyanided compounds of the treated gas.

The invention consists in this that the process of purification comprises a stage in which, after the separation of the iron sulphide, the solution containing alkali metal ferrocyanide is treated with a compound of iron in the presence of carbon dioxide or with a carbonated compound of iron in order to precipitate ferrous or ferric ferrocyanide which is separated out before regenerating the alkaline purifying liquor which is re-utilized.

The invention further provides for the recuperation of carbonic acid in the process of regeneration of the resulting bicarbonated solution after the separation of the ferrocyanide of iron and the re-utilization of this carbonic acid in the stage of precipitation of the ferrocyanide of iron. The invention is more fully described hereinafter, with reference to Figures 1 and 2 in the accompanying drawings which illustrate diagrammatically examples of embodiment of the invention.

As shown in Figure 1, the gas (for example, coke oven or lighting gas), from which have been previously removed, by the usual processes employed, the tars and ammonia it contains, is, in the known manner, admitted at the base of the column 1 from the top of which it issues purified after having encountered the purifying liquor—for example, a solution of $Na_2CO_3$—which is distributed at the upper part of the column 1. The purifying liquor which passes out at the base of the column, after having absorbed the sulphuretted hydrogen, hydrocyanic acid and a part of the carbon dioxide contained in the treated gas is, as is known, composed of sodium hydrosulphide NaHS, sodium cyanide NaCy and sodium bicarbonate $NaHCO_3$, in an excess of neutral or normal carbonate.

For the purpose of transformnig the sulphur and the cyanogen absorbed by the purifying liquor, the polluted solution is led, through a duct 2 into a mixer 3 effecting an intimate contact with a compound of iron, for example, ferrous hydrate $Fe(OH)_2$ which is admitted into the mixer in a sufficient quantity in order to fix all the sulphur and the cyanogen of the solution. The hydroxide of iron may be admitted through 29, advantageously and preferably, in the form of an aqueous paste prepared in a vessel or decanter 28.

The resulting solution holding in suspension precipitated iron sulphide and a slight excess of hydroxide of iron, issues from the mixer 3 to be led, through the duct 4, into a decanter 5. The decanter liquid, flowing out of the decanter 5, contains sodium ferrocyanide ($Na_4FeCy_6$), sodium carbonate ($Na_2CO_3$) and sodium bicarbonate ($NaHCO_3$), while the precipitated iron sulphide (FeS) is expelled with the excess of reagent from the decanter in the form of a sludge.

Through a duct 6, the solution of sodium ferrocyanide is directed into a mixer 7 which also receives, for example, a carbonated compound of iron, led in through 8. The liquid charged with the carbonate compound of iron is led through 9 into a rotary washer 10 (for example of the Standard type). A current of carbon dioxide ($CO_2$) enters the washer 10, passes through the latter and is placed therein in intimate contact in the liquid. The possible excess of carbon dioxide and the inert gases which may accompany it pass out of the washer at $p$. The carbon dioxide may be obtained from any source.

The object of this treatment by carbon dioxide is to render soluble the compound of iron employed as reagent and to thus bring it into the most favorable conditions under which it can react with the sodium ferrocyanide in the solution, in order to form ferrocyanide of iron.

A further object of the carbon dioxide is to transform the sodium carbonate which may already exist in the solution or which may be formed by the action of the carbonate of iron upon the sodium ferrocyanide, so as to prevent the action, which is, however, not very strong, of the sodium carbonate upon the ferric ferrocyanide. Moreover, as a consequence of this carbonation of the solution, the caustic soda which may be formed—if a part of the compound of iron acts as hydroxide—is immediately transformed into carbonate so that there is no fear of the caustic soda decomposing the ferrocyanide of iron formed.

The reactions of the formation of the ferric ferrocyanide may be represented by the following equations:

(1) $3Na_4FeCy_6 + 2Fe_2(CO_3)_3 =$
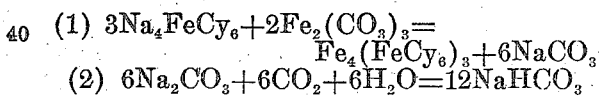
(2) $6Na_2CO_3 + 6CO_2 + 6H_2O = 12NaHCO_3$ In equation (1) it is estimated, and it is probable, that the carbonate of iron acts in the form of ferric carbonate ($Fe_2(CO_3)_3$), for the carbonate of iron precipitated retains some carbon dioxide and it has been recognized that the more this carbonate retains carbon dioxide the more rapid is its action upon the alkaline metal ferrocyanide in solution.

The liquid bi-carbonate holding in suspension the ferrocyanide of iron is removed from the washer 10, through a duct 11, towards a decanter 12.

The precipitate of ferrocyanide of iron is evacuated from the bottom of the decanter 12 in the form of a blue sludge and is led through 13 upon a rotary filter from which it issues more or less dry at $t$. The filtrate evacuated through 15 is added to the clear decanted liquid, issuing from the decanter through 16 and is led with the latter to a pump 17, which raises the separated solution, through the duct 18 to the top of a tower 19. In this tower, the solution of alkaline bi-carbonate is strongly stirred by air blown in by a fan 20 and admitted at the base of the tower through a duct 21, in order to be regenerated to the alkaline carbonate state. This regeneration may be speeded up by previous heating of the solution to be regenerated or by using hot air or by both means. A pump 22 forces the regenerated alkaline carbonate solution through a duct 23 towards the absorption column 1 where the solution is again employed.

Of course, in another application of the invention, the compound of iron intended for transforming the sulphur and the cyanogen into sulphide of iron and alkali metal ferrocyanide respectively may, in the known manner, be added to the alkaline solution before the entry of the latter into the absorption column, the absorption agent then consisting, for example, of a suspension of hydroxide of iron in the solution of alkaline carbonate.

In this case, the mixer 3, is dispensed with or displaced in the duct 23.

In a particularly advantageous form of the invention, the carbon dioxide or mixture of air and carbon dioxide obtained from the regeneration by air in 19 of the resulting bi-carbonated solution after the separation of the ferric ferrocyanide, is, as shown in Figure 1 in dot-and-dash lines, directed towards the washer 10, to be used there in the carbonation of the stage of precipitation of the ferric ferrocyanide.

In this case the oxidizing action of the air may also intervene in the formation of the ferric ferrocyanide by oxidation of the ferrous ferrocyanide which may be formed.

In the embodiment shown in Figure 2, in which occur again the same members indicated by the same reference numerals, the regeneration of the bicarbonated solution resulting after the separation of the ferrocyanide of iron is effected, wholly or in part, by neutralization with ferrous or ferric hydroxide.

The bicarbonated solution arriving through the ducts 15 and 16 is directed into a mixer 24 in which is admitted, for example, ferrous hydrate, preferably in the form of a paste.

A suspension of carbonate of iron is formed in the solution and the mixture is directed through 25 into a decanter 26. In this way the complete neutralization of the bicarbonated solution may be effected and consequently its regeneration into the state of carbonate solution which leaves the decanter through 18 to be directed towards the pump 22, which forces it through 23 to absorption tower 1. Carbonate of iron removed through 27 from the bottom of the decanter is directed towards the mixer 7 to be used in the stage of precipitation of the ferrocyanide of iron.

This neutralization of the bicarbonated solution in the mixer 24 may be effected only partly, with the object of only producing the exact quantity of carbonate of iron necessary for the formation of the ferrocyanide of iron in the mixer 7 and the washer 10.

In this case, the bicarbonated alkaline solution leaving the decanter 26 may be partly regenerated, for example, by air, as in the previous example, the carbon dioxide or mixture of air and carbon dioxide obtained from this operation being then also directed towards the washer 10 as in the previous example. In the case where the neutralization or regeneration effected is more complete, the amount of carbonate of iron necessary for the stage of precipitation of the ferrocyanide of iron may be previously raised to the decanter 26 and the remainder of the carbonate of iron utilized in the mixer 3 for the stage of precipitation of the iron sulphide. When the neutralization effected in the mixer 24 is complete, the carbonate of iron may be left in suspension in the alkaline solution regenerated and the mixture be employed as absorption agent in the column 1.

In these two last cases, however, the carbonate of iron used in the mixer 3, or used in suspension in the absorption stage of the column 1, may not retain carbon dioxide which, upon the formation of iron sulphide would also tend to form already ferrous or ferric ferrocyanide. In order to overcome this drawback the carbonate of iron employed for precipitating the iron sulphide in the mixer 3 may be made neutral, for example by the addition of a relatively small proportion of caustic alkali. For the same purpose the alkaline suspension of carbonate of iron, utilized in the absorption column 1 may previously have added to it a proportion of caustic alkali sufficient to neutralize the free carbon dioxide which would be retained by the carbonate of iron in suspension in the carbonate solution.

This addition of caustic alkali has also the advantage of compensating for the unavoidable losses of alkaline agent in the process, the transforming of the caustic alkali into carbonate being obtainable if desired by the absorption of the carbon dioxide of the gas treated in the absorption column, 1, or by the use of an external source of carbon dioxide in the stage of precipitation of the ferric ferrocyanide.

Other embodiments and applications of the invention are possible and a feature of the invention also resides in the fact that it may be applied to existing installations employed for carrying out known processes of purification of the gas recalled, in which the regenerating air carrying along the sulphuretted and cyanided compounds have up to the present been rejected into the atmosphere. In such cases, this air or gaseous mixture containing sulphuretted and cyanided compounds, or the latter only, is treated by the process of purification according to the invention in order to recuperate the cyanogen in the state of ferrocyanide of iron.

In each case the process may be carried out in such a way that the quantity of compound of iron, added for the precipitation of the iron sulphide is a little greater than that necessary to fix all the sulphur, while the amount of compound of iron added for the precipitation of the ferrocyanide of iron is less than that necessary to fix all the cyanogen. In this way there is obtained, in the stage of precipitation of the ferrocyanide of iron, the entire absence of sulphur, and the avoidance of an excess of compound of iron in the ferrocyanide of iron precipitated, which thus forms a pure commercial product.

What I claim as my invention, and desire to secure by Letters Patent is:

1. In a process for removing sulphuretted hydrogen, hydrocyanic acid and other constituents of the kind, from gases in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, and separating the precipitated ferrocyanide of iron.

2. In a process for removing sulphuretted hydrogen, hydrocyanic acid and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a carbonate compound of iron, and separating the precipitated ferrocyanide of iron.

3. In a process for removing sulphuretted hydrogen, hydrocyanic acid, and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, separating the precipitated ferrocyanide of iron, regenerating the resulting alkaline liquor, and re-utilizing said regenerated liquor in the absorption process.

4. In a process for removing sulphuretted hydrogen, hydrocyanic acid, and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a carbonate compound of iron, separating the precipitated ferrocyanide of iron, regenerating the resulting alkaline liquor, and re-utilizing said regenerated liquor in the absorption process.

5. In a process for removing sulphuretted hydrogen, hydrocyanic acid and other constituents of the kind, from gases in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, and separating the precipitated ferrocyanide of iron, wherein the carbon dioxide obtained from the regeneration by air of the resulting bicarbonated solution after the separation of ferric ferrocyanide, is re-utilized in the stage of precipitation of the latter.

6. In a process for removing sulphuretted hydrogen, hydrocyanic acid and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a carbonate compound of iron, and separating the precipitated ferrocyanide of iron, wherein the carbon dioxide obtained from the regeneration by air of the resulting bicarbonated solution after the separation of ferric ferrocyanide, is re-utilized in the stage of precipitation of the latter.

7. In a process for removing sulphuretted hydrogen, hydrocyanic acid, and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, separating the precipitated ferrocyanide of iron, regenerating the resulting alkaline liquor, and re-utilizing said regenerated liquor in the absorption process, wherein the carbon dioxide obtained from the regeneration by air of the resulting bicarbonated solution after the separation of ferric ferrocyanide, is re-utilized in the stage of precipitation of the latter.

8. In a process for removing sulphuretted hydrogen, hydrocyanic acid and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a carbonate compound of iron, and separating the precipitated ferrocyanide of iron, wherein the regeneration of the resulting bicarbonated solution, after the separation of the ferrocyanide of iron, is effected at least in part, by neutralization with an iron hydroxide which is utilized in the stage of precipitation of the ferrocyanide of iron.

9. In a process for removing sulphuretted hydrogen, hydrocyanic acid, and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, separating the precipitated ferrocyanide of iron, regenerating the resulting alkaline liquor, and re-utilizing said regenerated liquor in the absorption process, wherein the regeneration of the resulting bicarbonated solution, after the separation of the ferrocyanide of iron, is effected at least in part, by neutralization with an iron hydroxide which is utilized in the stage of precipitation of the ferrocyanide of iron.

10. In a process for removing sulphuretted hydrogen, hydrocyanic acid, and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a carbonate compound of iron, separating the precipitated ferrocyanide of iron, regenerating the resulting alkaline liquor, and re-utilizing said regenerated liquor in the absorption process, wherein the regeneration of the resulting bicarbonated solution, after the separation of the ferrocyanide of iron, is effected at least in part, by neutralization with an iron hydroxide which is utilized in the stage of precipitation of the ferrocyanide of iron.

11. The process of claim 1 applied to the regenerating air of known gas purifying processes.

12. The process of claim 2 applied to the regenerating air of known gas purifying processes.

13. The process of claim 3 applied to the regenerating air of known gas purifying processes.

14. The process of claim 4 applied to the regenerating air of known gas purifying processes.

15. The process of claim 5 applied to the regenerating air of known gas purifying processes.

16. The process of claim 6 applied to the regenerating air of known gas purifying processes.

17. The process of claim 7 applied to the regenerating air of known gas purifying processes.

18. The process of claim 8 applied to the regenerating air of known gas purifying processes.

19. The process of claim 9 applied to the regenerating air of known gas purifying processes.

20. The process of claim 10 applied to the regenerating air of known gas purifying processes.

21. In a process for removing sulphuretted hydrogen, hydrocyanic acid and other constituents of the kind, from gases in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, and separating the precipitated ferrocyanide of iron, wherein the carbon dioxide obtained from the regeneration by heat of the resulting bicarbonated solution after the separation of ferric ferrocyanide, is re-utilized in the stage of precipitation of the latter.

22. In a process for removing sulphuretted hydrogen, hydrocyanic acid and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a carbonate compound of iron, and separating the precipitated ferrocyanide of iron, wherein the carbon dioxide obtained from the regeneration by heat of the resulting bicarbonated solution after the separation of ferric ferrocyanide, is re-utilized in the stage of precipitation of the latter.

23. In a process for removing sulphuretted hydrogen, hydrocyanic acid, and other constituents of the kind, from gases, in which the constituents are absorbed by an alkaline solution which is placed in the presence of a compound of iron capable of fixing the sulphur in the state of iron sulphide,—the steps comprising separating the iron sulphide, treating the resulting solution containing alkali metal ferrocyanide with a compound of iron in the presence of carbon dioxide, separating the precipitated ferrocyanide of iron, regenerating the resulting alkaline liquor, and re-utilizing said regenerated liquor in the absorption process, wherein the carbon dioxide obtained from the regeneration by heat of the resulting bicarbonated solution after the separation of ferric ferrocyanide, is re-utilized in the stage of precipitation of the latter.

In testimony whereof I have signed my name to this specification.

SYLVAIN COULIER.